United States Patent
Barry et al.

(10) Patent No.: US 6,356,994 B1
(45) Date of Patent: Mar. 12, 2002

(54) METHODS AND APPARATUS FOR INSTRUCTION ADDRESSING IN INDIRECT VLIW PROCESSORS

(75) Inventors: Edwin F. Barry; Gerald G. Pechanek, both of Cary, NC (US)

(73) Assignee: BOPS, Incorporated, Chapel Hill, NC (US)

(*) Notice: Subject to any disclaimer, the term of this patent is extended or adjusted under 35 U.S.C. 154(b) by 0 days.

(21) Appl. No.: 09/350,191

(22) Filed: Jul. 9, 1999

Related U.S. Application Data
(60) Provisional application No. 60/092,130, filed on Jul. 9, 1998.

(51) Int. Cl.[7] .............................................. G06F 15/00
(52) U.S. Cl. ............................. 712/24; 712/11; 712/18; 712/20; 712/200; 712/210
(58) Field of Search ................................ 712/11, 18, 20, 712/24, 200, 210

(56) References Cited

U.S. PATENT DOCUMENTS

| | | | | |
|---|---|---|---|---|
| 5,649,135 A | * | 7/1997 | Pechanek et al. | 712/200 |
| 5,659,785 A | * | 8/1997 | Pechanek et al. | 712/11 |
| 5,761,470 A | * | 6/1998 | Yoshida | 712/210 |
| 5,774,737 A | * | 6/1998 | Nakano | 712/24 |
| 6,151,668 A | * | 11/2000 | Pechanek et al. | 712/24 |

* cited by examiner

Primary Examiner—Meng-Al T. An
Assistant Examiner—Nabil El-Hady
(74) Attorney, Agent, or Firm—Priest & Goldstein, PLLC

(57) ABSTRACT

An indirect VLIW (iVLIW) architecture is described which contains a minimum of two instruction memories. The first instruction memory (SIM) contains short-instruction-words (SIWs) of a fixed length. The second instruction memory (VIM), contains very-long-instruction-words (VLIWs) which allow execution of multiple instructions in parallel. Each SIW may be fetched and executed as an independent instruction by one of the available execution units. A special class of SIW is used to reference the VIM indirectly to either execute or load a specified VLIW instruction (called an "XV" instruction for "eXecute VLIW", or LV for "Load VLIW"). In these cases, the SIW instruction specifies how the location of the VLIW is to be accessed. Other aspects of this approach relate to the application of data memory addressing techniques for execution or loading of VLIWs that parallel the addressing modes used for data memory accesses. These addressing techniques provide tremendous flexibility for VLIW instruction execution.

11 Claims, 16 Drawing Sheets

FIG. 4B

LV-LOAD/DISABLE VLIW — 480

ENCODING 482

| 31 30 | 29 | 28 27 26 25 | 24 | 23 22 | 21 20 19 18 17 16 15 14 13 12 | 11 | 10 | 9 | 8 | 7 6 5 4 3 2 | 1 0 |
|---|---|---|---|---|---|---|---|---|---|---|---|
| Group | S/P | CtrlOp | E/D | UAF | InstrCnt 0 0 0 SU LU ALU MAU DSU | Vb | 0 | | | VIMOFFS | |

SYNTAX/OPERATION 484

| INSTRUC-TION | OPERANDS | OPERATION |
|---|---|---|
| LV2.[SP] | V[01], VIMOFFS, InstrCnt, D={SLAMD}, F=[AMDN] | (V[01]+VIMOFFS)[SU].enable ← 0 if (D=S)<br>(V[01]+VIMOFFS)[LU].enable ← 0 if (D=L)<br>(V[01]+VIMOFFS)[ALU].enable ← 0 if (D=A)<br>(V[01]+VIMOFFS)[MAU].enable ← 0 if (D=M)<br>(V[01]+VIMOFFS)[DSU].enable ← 0 if (D=D)<br><br>(V[01]+VIMOFFS)[UAF] ← ALU if(F=A or F=)<br>(V[01]+VIMOFFS)[UAF] ← MAU if(F=M)<br>(V[01]+VIMOFFS)[UAF] ← DSU if(F=D)<br>(V[01]+VIMOFFS)[UAF] ← None if(F=N)<br><br>for (i=0; i<InstrCnt; i++){<br>Load instruction into (V[01]+VIMOFFS)<br>if (SU Instr AND D !=S){(V[01]+VIMOFFS)[SU].enable ← 1}<br>if (LU Instr AND D !=L){(V[01]+VIMOFFS)[LU].enable ← 1}<br>if (ALU Instr AND D !=A){(V[01+VIMOFFS)[ALU].enable ← 1}<br>if (MAU Instr AND D !=M){(V[01+VIMOFFS)[MAU].enable ← 1}<br>if (DSU Instr AND D !=D){(V[01+VIMOFFS)[DSU].enable ← 1}<br>} |

ARITHMETIC FLAGS AFFECTED
NONE
CYCLES: 1 + NUMBER OF INSTRUCTIONS LOADED (InstrCnt)

FIG. 4C

SETV-SET VLIW SLOT STATE — 485

ENCODING — 487

| 31 30 | 29 | 28 27 26 25 | 24 | 23 22 21 | 20 | 19 | 18 | 17 | 16 | 15 | 14 | 13 | 12 | 11 | 10 | 9 | 8 | 7 6 5 4 3 2 1 0 |
|---|---|---|---|---|---|---|---|---|---|---|---|---|---|---|---|---|---|---|
| Group | S/P | CtrlOp | E/D | UAF | 0 | 0 | 0 | 0 | 0 | 0 | 0 | SU | LU | ALU | MAU | DSU | Vb | 0 VIMOFFS |

SYNTAX/OPERATION — 489

| INSTRUC-TION | OPERANDS | OPERATION |
|---|---|---|
| SETV.[SP] | V[01], VIMOFFS, E={SLAMD}, F=[AMDN] | (V[01]+VIMOFFS)[SU].enable ← 1 if (E=S), else 0<br>(V[01]+VIMOFFS)[LU].enable ← 1 if (E=L), else 0<br>(V[01]+VIMOFFS)[ALU].enable ← 1 if (E=A), else 0<br>(V[01]+VIMOFFS)[MAU].enable ← 1 if (E=M), else 0<br>(V[01]+VIMOFFS)[DSU].enable ← 1 if (E=D), else 0<br><br>(V[01]+VIMOFFS)[UAF] ← ALU if(F=A or F=)<br>(V[01]+VIMOFFS)[UAF] ← MAU if(F=M)<br>(V[01]+VIMOFFS)[UAF] ← DSU if(F=D)<br>(V[01]+VIMOFFS)[UAF] ← None if(F=N) |

ARITHMETIC FLAGS AFFECTED
NONE
CYCLES: 1

FIG. 4D

XV-EXECUTE VLIW

490

ENCODING

492

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | CtrlOp | | | | | VX | | UAF | | RFI | | CE2 | | 0 | 0 | 0 | SU | LU | ALU | MAU | DSU | Vb | 0 | VimOffs | | | | | |

SYNTAX/OPERATION

494

| INSTRUC-TION | OPERANDS | OPERATION |
|---|---|---|
| XV.[SP] | V[01], VIMOFFS, E={SLAMD}, F=[AMDN], R=[01N] | Execute (V[01]+VIMOFFS)[SU] if (E=S)<br>Execute (V[01]+VIMOFFS)[LU] if (E=L)<br>Execute (V[01]+VIMOFFS)[ALU] if (E=A)<br>Execute (V[01]+VIMOFFS)[MAU] if (E=M)<br>Execute (V[01]+VIMOFFS)[DSU] if (E=D)<br><br>(V[01]+VIMOFFS)[UAF] ← ALU if(F= or F=A)<br>(V[01]+VIMOFFS)[UAF] ← MAU if(F=M)<br>(V[01]+VIMOFFS)[UAF] ← DSU if(F=D)<br>(V[01]+VIMOFFS)[UAF] ← None if(F=N) |

ARITHMETIC FLAGS AFFECTED
CONDITION FLAGS ARE SET BY THE INDIVIDUAL SIMPLEX INSTRUCTION IN THE SLOT SPECIFIED BY THE SETTING OF 'F=' PARAMETER FROM THE ORIGINAL LV INSTRUCTION OR AS OVERRIDDEN BY A 'F=[AMD]' PARAMETER IN THE XV INSTRUCTION. CONDITION FLAGS ARE NOT AFFECTED WHEN 'F=N' OR WHEN XV IS CONDITIONALLY EXECUTED VIA [T.] OR [F.].
CYCLES: 1

```
!File Specification***********************************************************
!
!Name: VbSMIMD.s
!Contents:
!This program is an example of using the Vb register to accomplish SMIMD execution.
!Specifically, this program computes either the maximum or the minimum of five numbers.
!Each PE either calcluates the maximum or the minimum, dependent upon a dynamically
!computed value,(in this example this value is loaded). This value can be different on each PE.
!End File Specification*******************************************************

!*****************************************************************************
!Initialization of SP and PE Local Memory Areas
!*****************************************************************************
!----------------------------------------------------------------
!SP Local memory for plane-0, ring-0
!----------------------------------------------------------------
.section .data_p0_r0_es !----------------------------------------------------------------
!PE0 Local memory (for plane-0, ring-0, element-0)
!----------------------------------------------------------------
.section .data_p0_r0_e0
decide_min_or_max:
.int 1,3            !these two elements determine whether the maximum or
                    !the minimum is to be computed for this PE.
data:
.int 10,2,5,8,6     !the minimum of these values will be computed since 1 <= 3.

!----------------------------------------------------------------
!PE1 Local memory (for plane-0, ring-0, element-1)
!----------------------------------------------------------------
.section .data_p0_r0_e1
.int 3,0            !these two elements determine whether the maximum or
                    !the minimum is to be computed for this PE.

data_pe1:
.int 5,2,3,9,7      !the minimum of these values will be computed since 3 > 0.
```

496a { (PE0 block)

496b { (PE1 block)

FIG. 4F

```
!
!----------------------------------------------------------------
!PE2 Local memory (for plane-0, ring-0, element-2)
!----------------------------------------------------------------
.section .data_p0_r0_e2
.int 5,9              !these two elements determine whether the maximum or
                      !the minimum is to be computed for this PE.
Data_pe2:
.int 9,5,1,2,4        !the minimum of these values will be computed since 5 <= 9.

!----------------------------------------------------------------
!PE3 Local memory (for plane-0, ring-0, element-3)
!----------------------------------------------------------------
.section .data_p0_r0_e3
.int 1,0              !these two elements determine whether the maximum or
                      !the minimum is to be computed for this PE.
Data_pe3:
.int 2,6,8,3,5        !the maximum of these values will be computed since 1 > 0.

!****************************************************************************
!Start of program instructions
!****************************************************************************
.section.text
start_0_0:
.start 0,0, start_0_0

!----------------------------------------------------------------
!Loading VIM contents. These VIM contents are the same for each PE.
!----------------------------------------------------------------
lim.p.h0 VAR, 0           !initialize VAR to be zero for all PEs.
lv.p  v0,0,2,d=,f=        !load VIM 0 with iVLIW that computes maximum
  lii.p.w R6,A1+,1        !load r6 from local memory
  max.pa.luw R7,R7,R6     !r7 := max(r7,r6)
lv.p  v0,1,2,d=,f=        !load VIM 1 with iVLIW that computes minimum
  lii.p.w R6,A1+,1        !load r6 from local memory
  min.pa.luw R7,R7,R6     !r7 := min(r7,r6)
```

- 496c (first block)
- 496d (second block)
- 497 (last block)

FIG. 4G

498
```
!--------------------------------------------------------------
!Setting up pointers to iVLIWs.
!--------------------------------------------------------------
lim.p.h0 R0, 0          !This points to an iVLIW that finds the maximum
lim.p.h0 R1, 1          !This points to an iVLIW that finds the minimum
```

499
```
!--------------------------------------------------------------
!Setting up initial minimum/maximum.
!--------------------------------------------------------------
lim.p.w R9, 0wffff      !Initial minimum
lim.p.w R8, 0           !Initial maximum !--------------------------------------------------------------
!Decide whether to compute the maximum or minimum. The data values that are
!present in the local memories for each PE for this example cause the minimum
!to be computed on PE0 and PE2 and the maximum to be computed on PE1 and PE3.
!--------------------------------------------------------------
lim.p.w A0, decide_min_or_max   !Loading R3 and R4 with integers.
lii.p.w R3,A0+,1                !R3 and R4 now have different values on each PE
lii.p.w R4,A0+,1 cmpGT.pa.1w R3,R4       !For each PE, compare the two values. If the first value
                        !is bigger than the second, that PE will compute the
                        !maximum, otherwise the minimum.

copys.pd.1w R7,R8,R9    !Set initial minimum/maximum with maxint/minint dependent
                        !upon compare.
copys.pd.1w R10,R0,R1   !r10 now points to iVLIW for maximum or minimum
calculation.
copys.pd.w VAR,R10      !Initialize the VAR to point to iVLIW code to compute a
                        !maximum or minimum. The VAR is now different for each PE.
```

499a
```
!--------------------------------------------------------------
!Executing the iVLIWs.
!--------------------------------------------------------------
lim.p.w A1, data        !Where to load the 5 data values on each PE from.

xv.p  v0,0,e=1,f=       !Execute the now SMIMD code to compute either the maximum
xv.p  v0,0,e=1a,f=      !or minumum of the five local data values on each PE.
xv.p  v0,0,e=1a,f=      !(20 data values for the 2x2 core).
xv.p  v0,0,e=1a,f=
xv.p  v0,0,e=1a,f=
xv.p  v0,0,e=a,f=
```

FIG. 4H

```
!------------------------------------------------------------
!In each PE, R7 now holds their local maximum or local minimum. In this
!example, the PE0 and PE2 now holds the minimum of their local data values,
!and PE1 and PE3 now holds the maximum of their local data values.
!------------------------------------------------------------

!------------------------------------------------------------
!Done
!------------------------------------------------------------
    svc  r0,r0,SVC_HALT  !Unconditionally halt the program
    nop
    nop
    nop
    nop
```

499b → !Done

FIG. 4I

COPYS-Copy Selective — 470

Encoding — 472

| 31 30 | 29 | 28 27 26 25 24 | 23 22 21 | 20 19 18 17 16 | 15 14 13 12 11 | 10 9 8 7 6 | 5 4 3 | 2 1 0 |
|---|---|---|---|---|---|---|---|---|
| GROUP | S/P | Unit | DSUopcode | Rt | Rx | Ry | DPack | 0 0 0 |
| | | | | Rte | 0 Rxe | 0 Rye | 0 | |

SYNTAX/OPERATION — 474

| INSTRUCTION | OPERAND | OPERATION | ACF |
|---|---|---|---|
| | | | Double word |
| COPYS.[SP] D.1D | Rte,Rxe,Rye | if(F0=1)Rto‖Rte ← Rxo‖Rxe else Rto‖Rte ← Ryo‖Rye | None |
| | | | Word |
| COPYS.[SP] D.1W | Rt,Rx,Ry | if(F0=1)Rt ← Rx else Rt ← Ry | None |
| | | | Dual Words |
| COPYS.[SP] D.2W | Rte,Rxe,Rye | if(F1=1)Rto ← Rxo else Rto ← Ryo<br>if(F0=1)Rte ← Rxe else Rte ← Rye | None |
| | | | Dual Halfwords |
| COPYS.[SP] D.2H | Rt,Rx,Ry | if(F1=1)Rt.H1 ← Rx.H1 else Rt.H1 ← Ry.H1<br>if(F0=1)Rt.H0 ← Rx.H0 else Rt.H0 ← Ry.H0 | None |
| | | | Quad Halfwords |
| COPYS.[SP] D.4H | Rte,Rxe,Rye | if(F3=1)Rto.H1 ← Rxo.H1 else Rto.H1 ← Ryo.H1<br>if(F2=1)Rto.H0 ← Rxo.H0 else Rto.H0 ← Ryo.H0<br>if(F1=1)Rte.H1 ← Rxe.H1 else Rte.H1 ← Rye.H1<br>if(F0=1)Rte.H0 ← Rxe.H0 else Rte.H0 ← Rye.H0 | None |
| | | | Quad Bytes |
| COPYS.[SP] D.4B | Rt,Rx,Ry | if(F3=1)Rt.B3 ← Rx.B3 else Rt.B3 ← Ry.B3<br>if(F2=1)Rt.B2 ← Rx.B2 else Rt.B2 ← Ry.B2<br>if(F1=1)Rt.B1 ← Rx.B1 else Rt.B1 ← Ry.B1<br>if(F0=1)Rt.B0 ← Rx.B0 else Rt.B0 ← Ry.B0 | None |
| | | | Octal Bytes |
| COPYS.[SP] D.8B | Rte,Rxe,Rye | if(F7=1)Rto.B3 ← Rxo.B3 else Rto.B3 ← Ryo.B3<br>if(F6=1)Rto.B2 ← Rxo.B2 else Rto.B2 ← Ryo.B2<br>if(F5=1)Rto.B1 ← Rxo.B1 else Rto.B1 ← Ryo.B1<br>if(F4=1)Rto.B0 ← Rxo.B0 else Rto.B0 ← Ryo.B0<br>if(F3=1)Rte.B3 ← Rxe.B3 else Rte.B3 ← Rye.B3<br>if(F2=1)Rte.B2 ← Rxe.B2 else Rte.B2 ← Rye.B2<br>if(F1=1)Rte.B1 ← Rxe.B1 else Rte.B1 ← Rye.B1<br>if(F0=1)Rte.B0 ← Rxe.B0 else Rte.B0 ← Rye.B0 | None |

ARITHMETIC SCALAR FLAGS AFFECTED
N = MSB OF RESULT
Z = NOT AFFECTED
V = NOT AFFECTED
C = NOT AFFECTED
CYCLES: 1

US 6,356,994 B1

METHODS AND APPARATUS FOR INSTRUCTION ADDRESSING IN INDIRECT VLIW PROCESSORS

CROSS-REFERENCE TO RELATED APPLICATION

The present application claims the benefit of U.S. Provisional Application Serial No. 60/092,130 entitled "Methods and Apparatus for Instruction Addressing in Indirect VLIW Processors" and filed Jul. 9, 1998.

FIELD OF THE INVENTION

The present invention relates generally to improvements in very long instruction word (VLIW) processing, and more particularly to advantageous methods and apparatus for instruction addressing in indirect VLIW (iVLIW) processors.

BACKGROUND OF THE INVENTION

In signal processing applications a high percentage of the algorithms use loops, usually with high iteration counts and consisting of relatively few instructions. Inside these loops, dramatic performance gains can usually be made by providing multiple functional units and executing instructions in parallel. A VLIW architecture provides a way to achieve these gains.

In typical VLIW processors, a wide memory for storing the VLIWs is provided. The memory is accessed for each instruction fetched and fed directly to the decode logic to control the execution of multiple execution units in parallel. A problem or inefficiency of operation results because sequential code does not make efficient use of the long instruction word. Underutilization of the very wide instruction memory results. In addition, treating the traditional VLIW memory as the central instruction memory for an array of processing elements would not work due to the necessity of distributing the wide VLIW bus throughout the array causing path timing and area problems.

SUMMARY OF THE INVENTION

An embodiment of a manifold array instruction set in accordance with the present invention provides for indirect VLIWs as described more fully below. A VLIW is selected by reference rather than by loading its constituent instructions as part of a single instruction stream. This separation of the program flow short instruction word (SIW) selection from VLIW selection allows both sequential code, a sequence of short instruction words, and parallel operations in the form of VLIWs to be encoded efficiently. The indirect nature of VLIW access in accordance with the present invention allows for great flexibility in both VLIW execution control and in the efficiency of VLIW memory usage. The invention described herein provides a programmer with a degree of flexibility in VLIW execution and loading which closely parallels that which is available for data access. This flexibility is provided by supplying the programmer with a set of addressing modes for VLIW access which are similar to data memory addressing modes. Some of these addressing modes allow a synchronous MIMD mechanism for the selection of different VLIWs in each PE in parallel and in synchronism. In addition, other addressing modes support the automatic incrementing of the VLIW memory address providing hardware support for selecting different VLIWs in an ordered sequence.

These and other advantages of the present invention will be apparent from the drawings and the Detailed Description which follow.

BRIEF DESCRIPTION OF THE DRAWINGS

FIGS. 4B, 4C, and 4D illustrate specific load/disable VLIW (LV), set VLIW slot state (SETV), and execute VLIW (XV) instructions, respectively;

FIGS. 4E, 4F, 4G, and 4H illustrate an exemplary synchronous MIMD program using one of the addressing modes in accordance with the present invention;

FIG. 4I illustrates a copy selective (COPYS) instruction used in the exemplary synchronous MIMD program of FIGS. 4E–4H;

DETAILED DESCRIPTION

Figure 1:
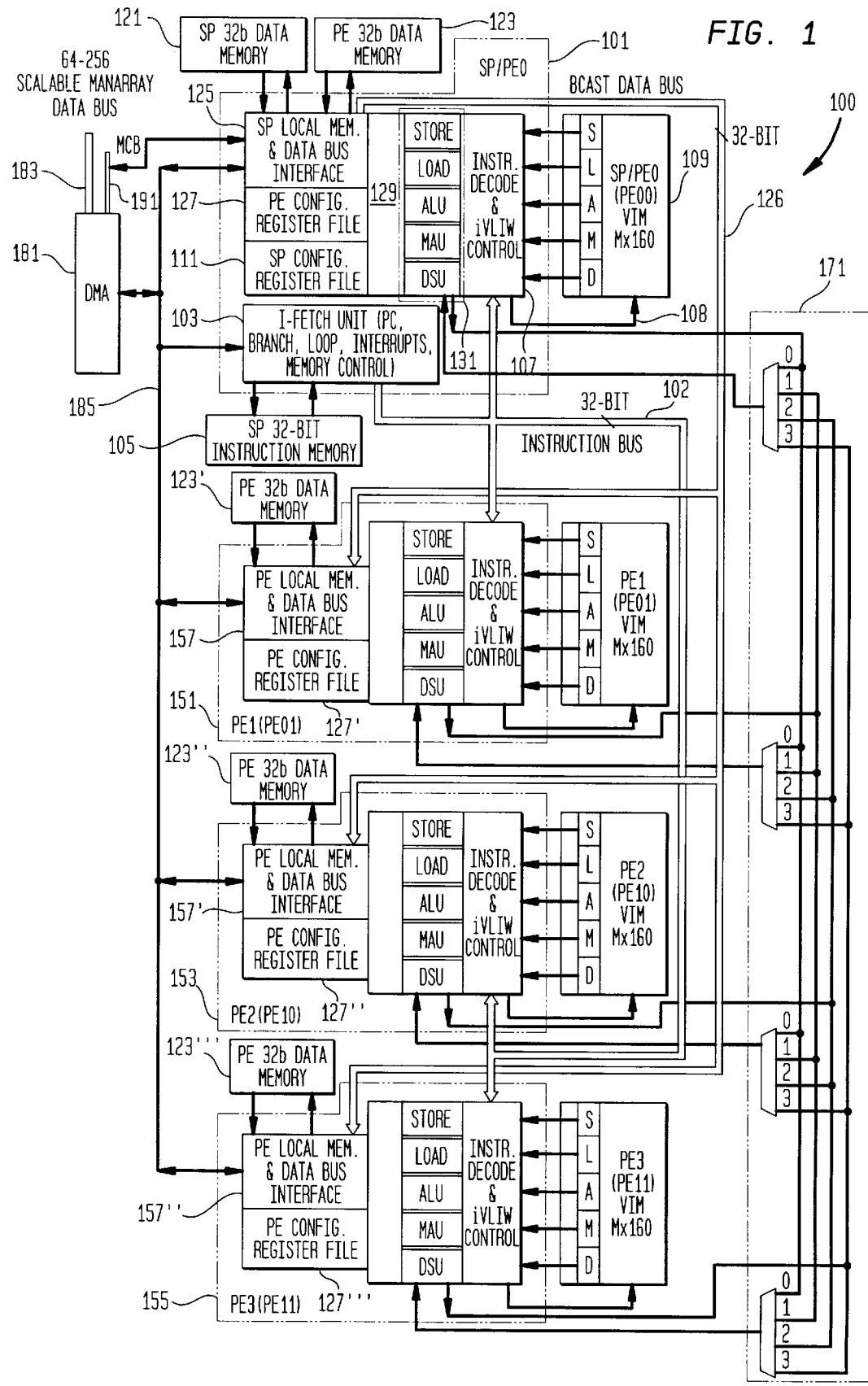
FIG. 1 illustrates an exemplary 2×2 ManArray iVLIW processor comprising iVLIW address generation and control functions and VLIW memory in a sequence processor (SP) combined with a processing element (PE0), and in three additional processing elements (PE1, PE2 and PE3) connected in an array for use in conjunction with the present invention.

Further details of a presently preferred ManArray architecture for use in conjunction with the present invention are found in U.S. patent application Ser. No. 08/885,310 filed Jun. 30, 1997, now U.S. Pat. No. 6,023,733, issued Feb. 8, 2000, U.S. patent application Ser. No. 08/949,122 filed Oct. 10, 1997, now U.S. Pat. No. 6,167,502, issued Dec. 26, 2000, U.S. patent application Ser. No. 09/169,255 filed Oct. 9, 1998, U.S. patent application Ser. No. 09/169,256 filed Oct. 9, 1998, now U.S. Pat No. 6,167,502, issued Dec. 26, 2000, U.S. patent application Ser. No. 09/169,072 filed Oct. 9, 1998, now U.S. Pat. No. 6,219,776, issued Apr. 17, 2001, U.S. patent application Ser. No. 09/187,539 filed Nov. 6, 1998, now U.S. Pat. No. 6,151,668, issued Nov. 21, 2000, U.S. patent application Ser. No. 09/205,558 filed Dec. 4, 1998, now U.S. Pat No. 6,279,060, issued Aug. 21, 2001, U.S. patent application Ser. No. 09/215,081 filed Dec. 18, 1998, now U.S. Pat. No. 6,101,592, issued Aug. 8, 2001, U.S. patent application Ser. No. 09/228,374, filed Jan. 12, 1999, now U.S. Pat. No. 6,216,223, issued Apr. 10, 2001 U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999 entitled "Efficient Complex Multiplication and Fast Fourier Transform (FFT) Implementation on the ManArray Architecture", as well as, Provisional Application Serial No. 60/092,130 entitled "Methods and Apparatus for Instruction Addressing in Indirect VLIW Processors" filed Jul. 9, 1998, Provisional Application Serial No. 60/103,712 entitled "Efficient Complex Multiplication and Fast Fourier Transform (FFT) Implementation on the ManArray" filed Oct. 9, 1998, Provisional Application Serial No. 60/106,867 entitled "Methods and Apparatus for Improved Motion Estimation for Video Encoding" filed Nov. 3, 1998, Provisional Application Serial No. 60/113,637 entitled "Methods and Apparatus for Providing Direct Memory Access (DMA) Engine" filed Dec. 23, 1998, Provisional Application Serial No. 60/113,555 entitled "Methods and Apparatus Providing Transfer Control" filed Dec. 23, 1998, Provisional Application Serial No. 60/139,946 entitled "Methods and Apparatus for Data Dependent Address Operations and Efficient Variable Length Code Decoding in a VLIW Processor" filed Jun. 18, 1999, Provisional Application Serial No. 60/140,162 entitled "Methods and Apparatus for Initiating and Resynchronizing Multi-Cycle SIMD Instructions" filed Jun. 21, 1999, Provisional Application Serial No. 60/140,163 entitled "Methods and Apparatus for Improved Efficiency in Pipeline Simulation and Emulation" filed Jun. 21, 1999, Provisional Application Serial No. 60/140,244 entitled "Methods and Apparatus for Providing One-By-One Manifold Array (1×1 ManArray) Program Context Switch Control" filed Jun. 21, 1999, Provisional Application Serial No. 60/140,245 entitled "Methods and Apparatus for Generalized Event Detection and Action Specification in a Processor" filed Jun. 21, 1999, Provisional Application Serial No. 60/140,325 entitled "Methods and Apparatus for Establishing Port Priority Functions in a VLIW Processor" filed Jun. 21, 1999, and Provisional Application Serial No. 60/140,425 entitled "Methods and Apparatus for Parallel Processing Utilizing a Manifold Array (ManArray) Architecture and Instruction Syntax" filed Jun. 22, 1999, respectively, and incorporated by reference herein in their entirety.

In a presently preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. patent application Ser. No. 09/169,072 filed Oct. 9, 1998 entitled "Methods and Apparatus for Dynamically Merging an Array Controller with an Array Processing Element", now U.S. Pat. No. 6,219,776, issued Apr. 17, 2001. Three additional PEs 151, 153, and 155 are also utilized to demonstrate the indirect VLIW addressing mode apparatus and instruction formats that provide programmer flexibility in developing high performance algorithms on the ManArray architecture in accordance with the present invention. It is noted that the PEs can be also labeled with their matrix positions as shown in parentheses for PE0 (PE00) 101, PE1 (PE01)151, PE2 (PE10) 153, and PE3 (PE11) 155. The SP/PE0 101 contains a fetch controller 103 to allow the fetching of short instruction words (SIWs) from a 32-bit instruction memory 105. The fetch controller 103 provides the typical functions needed in a programmable processor such as a program counter (PC), branch capability, EventPoint loop operations, support for interrupts, and also provides the instruction memory control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 filed Nov. 6, 1998, entitled "Methods and Apparatus for Efficient Synchronous MIMD Operations with iVLIW PE-to-PE Communication" now U.S. Pat. No. 6,151,668, issued Nov. 21, 2000. Also contained in the SP/PE0 and the other PEs is a common PE configurable register file 127 which is described in further detail in U.S. patent application Ser. No. 09/169,255 filed Oct. 9, 1998, entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 more completely described in U.S. patent application Ser. No. 08/885,310 filed Jun. 30, 1997 entitled "Manifold Array Processor", now U.S. Pat. No. 6,023,753, issued Feb. 8, 2000, U.S. application Ser. No. 08/949,122 filed Oct. 10, 1997 entitled "Methods and Apparatus for Manifold Array Processing", now U.S. Pat. No. 6,167,502, issued Dec. 26, 2000, and U.S. application Ser. No. 09/169,256 filed Oct. 9, 1998 entitled "Methods and Apparatus for ManArray PE-to-PE Switch Control", now U.S. Pat. No. 6,167,501, issued Dec. 26, 2000. The interface to a host processor, other peripheral devices, and/or external memory can be done in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

The present invention focuses on aspects of VLIW memory address generation units and instructions for use in conjunction therewith that can support different indirect addressing modes for VLIW access providing a programmer with a degree of flexibility in VLIW execution and loading which closely parallels that which is available for data access. The following discussion provides descriptions of some of the addressing modes available for selecting VLIWs for loading and execution. VIM address generation can be done a number of ways including a direct VIM addressing approach illustrated in FIG. 2, a base plus offset (base+offset) VIM addressing approach illustrated in FIGS. 3 and 4, an indirect/indexed VIM addressing approach shown in FIG. 5, a base plus index (base+index) VIM addressing approach as in FIG. 6, a circular indirect/indexed VIM addressing approach illustrated in FIG. 7, and a PE relative VIM addressing approach shown in FIG. 8. In each of these cases, there may be an address generation function unit (AGU) and some number "n" of VIM address registers that are incorporated in the instruction decode and iVLIW control unit 107 in a combined SP/PE such as the SP/PE0 101 of FIG. 1, and in each PE in an array of PEs, for example, the PEs 151, 153, and 155 of FIG. 1.

In FIG. 1 the SIW fetch unit 103 fetches instructions from a "short" instruction memory (SIM) 105. These short instructions are dispatched to the instruction decode and iVLIW control units 107 in the SP/PE0 101 and in each PE 151, 152 and 155. Based upon a predecode function, the instruction pipeline is expanded for indirect VLIW SIWs allowing sufficient time to fetch the VLIW from the local VIMs 109 in the SP/PE0 and in each PE. It is during this additional pipeline cycle that the VIM AGU, located in the control units 107 in each PE, generates the VIM address and control signals 108 as specified by the indirect VLIW SIW. For more details on a presently preferred dynamic pipeline approach, see "Methods and Apparatus to Dynamically Reconfigure the Instruction Pipeline of an indirect Very Long Instruction Word Scalable Processor", U.S. application Ser. No. 09/228,374 filed Jan. 12, 1999, now U.S. Pat. No. 6,216,223, issued Apr. 10, 2001.

The VLIW fetched from the VIM is associated with instructions that are directed to a plurality of execution units 131 identified by the letters SLAMD, short for Store, Load, ALU, MAU and DSU units in SP/PE0 and in each of the PEs. While the exemplary ManArray system 100 of FIG. 1 uses five execution units 131, the number of execution units is not limited to those specifically disclosed as presently preferred but will be dictated by the implementation and application needs of a particular design or intended environment. A variety of addressing approaches may be suitably employed in accordance with the present invention, as discussed further below.

Direct Addressing

Figure 2:
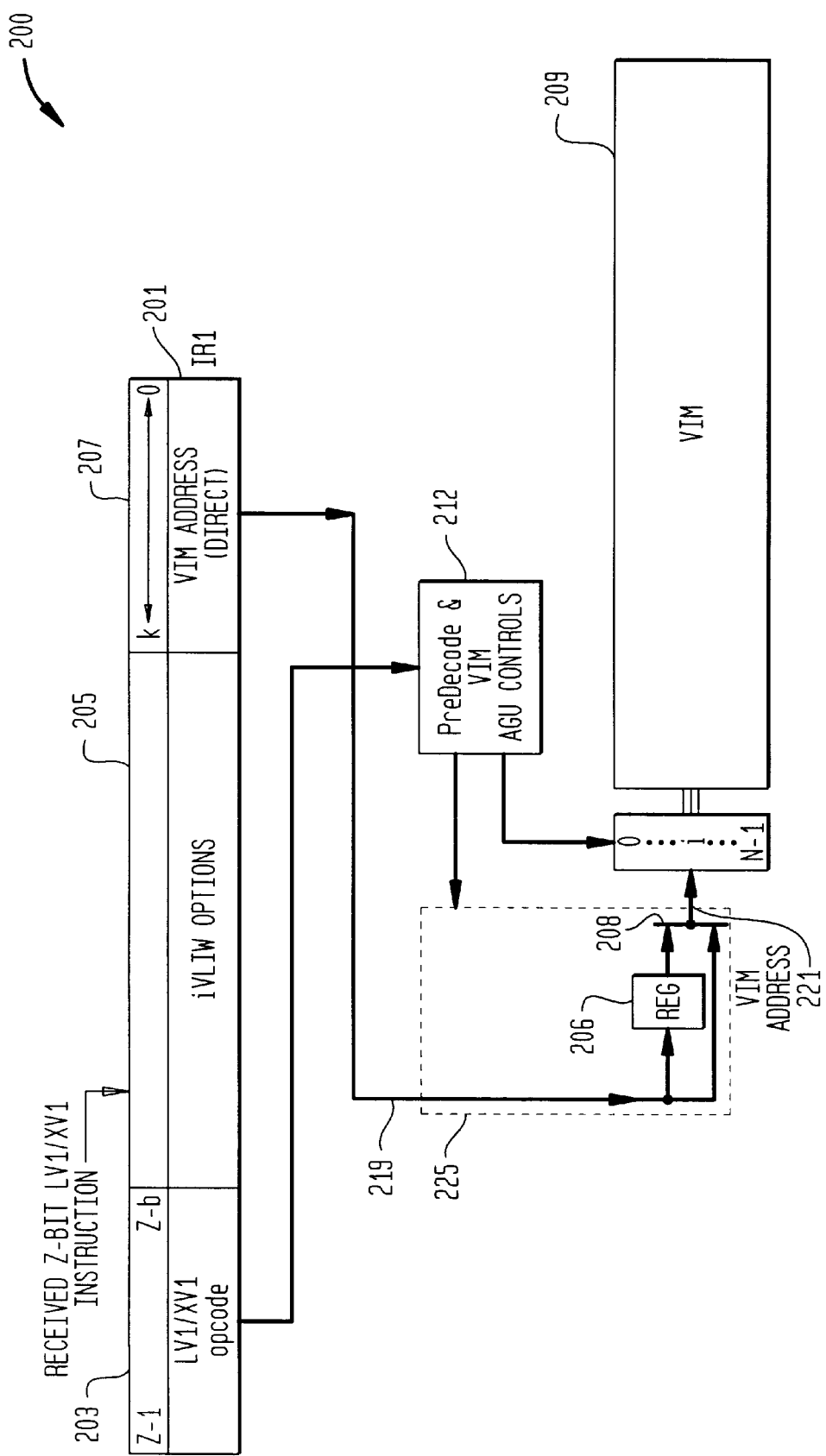
FIG. 2 illustrates a direct addressing mode apparatus and instruction format in accordance with the present invention.

Direct addressing allows a VIM address to be specified as an explicit value in an iVLIW SIW instruction, such as instruction 201 shown in direct VIM addressing mode apparatus 200 of FIG. 2. The iVLIW SIW as it is received in an instruction register 1 (IR1) 201 is logically formatted into three major sections or fields, one section 203 for the opcode which may include a VIM addressing modes option field, one section 205 for various iVLIW options defining the function of the issued SIW, and one section 207 for the VIM direct address. A precode and VIM address generation unit (AGU) control block 212 determines that the VIM addressing mode for the instruction in register IR1 201 is a direct VIM addressing mode and provides the proper VIM AGU control signals to VIM address selection block 225 which may be implemented by a register 206 and multiplexer 208 as discussed further below. The control signals selectively pass the desired VIM address through the selection block 225 to the VIM 209. For the case of an execute VLIW (XV) SIW, the k–0 bits of the VIM address field 207 are used to directly address the VIM 209 by selecting the VIM address value 219 through the multiplexer 208 creating the VIM address 221. For the case of a load VLIW (LV) SIW, the direct address in the LV instruction is stored in the register 206, and the VIM address 221 results from selecting register 206 through the multiplexer 208 for each instruction to be loaded into a VLIW in VIM 209 at the address register specified by 206. For the exemplary embodiment of FIG. 1, the VLIW may include up to five instructions, one for each of the SLAMD slots.

PreDecode and AGU Controls Block Description

The predecode and VIM address generation unit (AGU) control block 212 of FIG. 2, as well as control blocks 312 (FIG. 2), 412 (FIG. 4A), 512 (FIG. 5), 612 (FIG. 6), 712 (FIG. 7), and 812 (FIG. 8) receive as inputs the opcode bit field and selected iVLIW control bit fields of an instruction received into the IR1 register. The opcode portion is decoded by standard means to determine the type of instruction and addressing mode required to properly execute the received instruction. The other selected fields, as shown in each of the respective FIGS. 2, 3, 4A, 5, 6, 7 and 8, are used to provide multiplexer, register, and VIM controls, including read and write enables as required by the multiplexer, register, and memory employed in a specific design implementation.

Base Plus Offset Addressing

Figure 3:
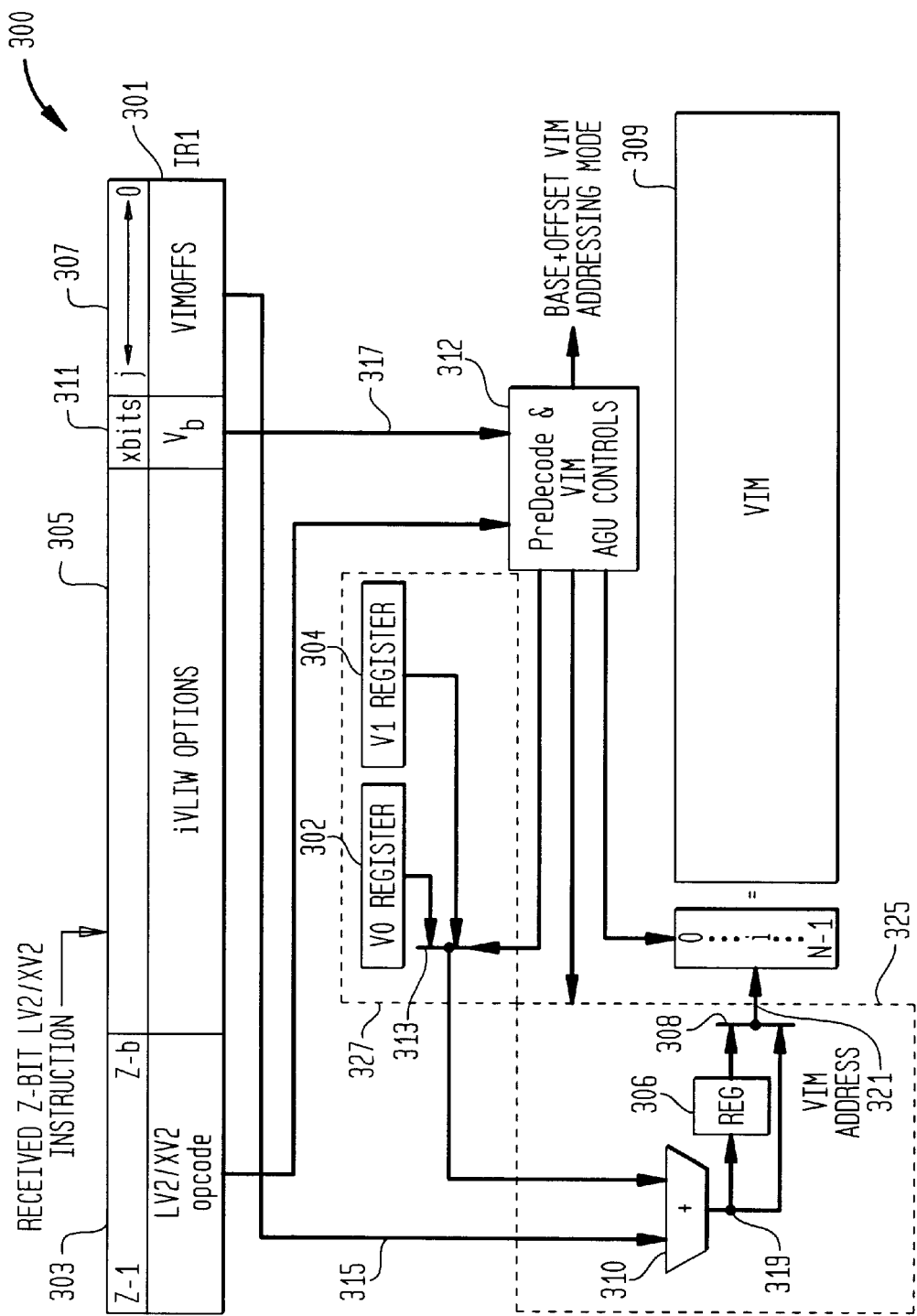
FIG. 3 illustrates a VLIW instruction memory (VIM) base-plus-offset addressing mode apparatus and instruction format in accordance with the present invention.

FIG. 3 illustrates a base-plus-offset (base+displacement), addressing mode apparatus 300 that allows a VLIW to be specified by the sum of the contents of a VIM address register and an offset value provided in the instruction. This addressing mode allows for easy relocation of blocks of VLIW code and ready extension of the VLIW instruction memory. In an implementation that uses multiple VIMs with one VIM per PE, this approach provides one mechanism of differentiating VLIWs to be executed within each PE. This differentiation may be readily made by assigning each PE a different value in its VIM address register used for the base. With this base plus offset VIM addressing mechanism, a single SIMD iVLIW SIW dispatched to an array of PEs causes a common offset to be added to different base address values in each PE allowing a different VLIW to be selected in each PE. Also, each PE can conditionally select a different base address register Vb. These synchronous MIMD models are explained in further detail below.

A base-plus-displacement VIM addressing SIW is shown as it is received in an instruction register (IR1) 301 of FIG. 3. The iVLIW instruction is logically formatted into four major sections or fields, one section 303 for the opcode which may include a VIM addressing modes option field, one section 305 for various iVLIW options defining the function of the issued SIW, one section 307 for the VIM offset address, and one section 311 specifying a base address register Vb, which in this exemplary case is either register 302 or 304. There are j+1 bits 307 for a VIMOFFS displacement field which can vary depending upon the implementation and the numbers of bits Z in the instruction. For example, Z can typically be 16, 24, 32, 48, or 64-bits though other number of bits are not precluded. Although two base registers are shown in FIG. 3 and described below, multiple VIM base registers can be specified through the xbit Vb field 311. The output of IR1 is pre-decoded by control unit 312 early in the pipeline cycle to control the VIM accessing and VLIW execution. The load path to store base address values into the registers 302 and 304 is not shown, but these registers are part of the processor's context and can be loaded, saved, and restored in a known manner. One of the VIM base registers 302 or 304 as specified by Vb is selected by multiplexer 313 and the selected base register value is provided to an input of adder 310. The VIM address generation function 325 adds the selected base register with the offset 307 provided in the instruction 301 via signal path 315. The result of the addition is stored in register 306 for Load VLIW (LV) instructions or directly selected by multiplexer 308 for XV instructions. The output 321 of the multiplexer 308 is used to address VIM 309.

Figure 4A:
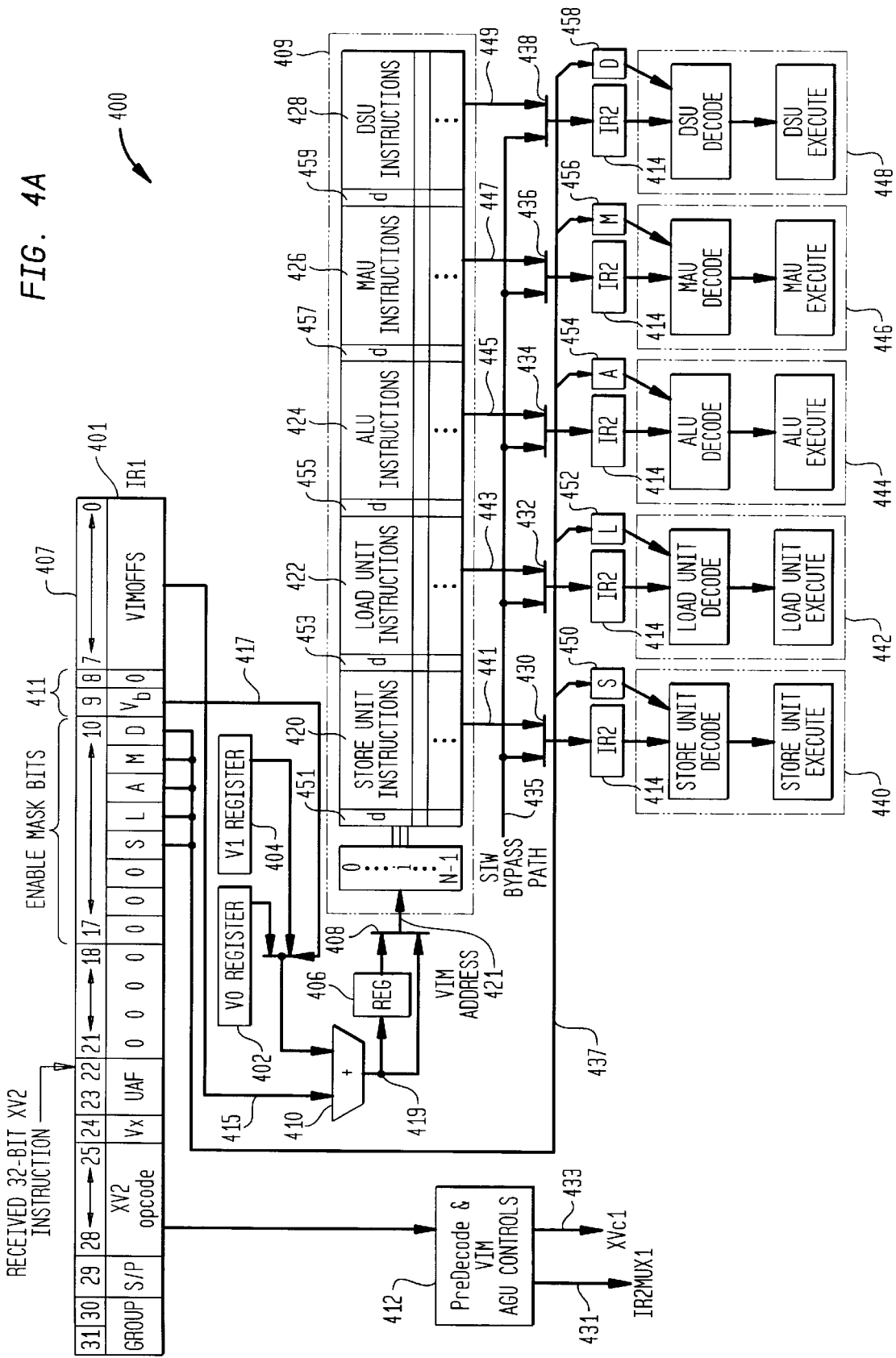
FIG. 4A illustrates a specific example of a VIM base-plus-offset addressing mode apparatus and instruction format in accordance with the present invention.

Further details of a specific implementation of base-offset indirect VLIW addressing in accordance with the present invention are shown in FIG. 4A. A Z=32-bit XV base-plus-offset instruction (XV2), referenced as XV2 in this discussion, is received into instruction registers 1 (IR1) 401. The output of IR1 is pre-decoded by control unit 412 early in the pipeline cycle prior to loading the values for the instruction registers 2 (IR2) 414. Upon receipt of an XV2 instruction in IR1 401, the VIM address 421 is calculated by use of the specified Vb register, either register 402 or 404 as selected by the Vb signal 417 sourced from IR1 401 bit-9, added by adder 410 to the offset value included in an XV instruction via path 415. The resulting VIM address 419 is passed through multiplexer 408 to address the VIM. The iVLIW at the specified address is read out of the VIM 409 and passes through the multiplexers 430, 432, 434, 436, and 438, to the IR2 registers 414. As an alternative to minimize the read VIM access timing critical path, the output of VIM 409 can be latched into a register whose output is passed through a multiplexer prior to the decode state logic. The enable mask bits, bits 10–17, part of the iVLIW options field 305 of FIG. 3 of the XV instruction stored in IR1 401, are distributed via path 437 to bit storage latches, S bit-14 to S latch 450, L bit-13 to L latch 452, A bit-12 to A latch 454, M bit 11 to M latch 456, and D bit-10 to D latch 458. These enable-mask-bits override the d-bit available-for-execution setting for each instruction slot stored in VIM for the XV execution cycle. Alternatively, the latches 450–458 can be avoided if the timing path allows the override logic to be placed at the output of the VIM prior to IR2 clocking. In either case, the functional units decode and execute logic 440–448 either executes a received instruction or executes a no operation (NOP) based upon the setting of the d-bits and the mask enable bits.

For XV2 execution, the IR2MUX1 control signal 431 in conjunction with the predecode XVc1 control signal 433 cause all the IR2 multiplexers, 430, 432, 434, 436, and 438, to select the VIM output paths, 441, 443, 445, 447, and 449. The mask enable bits are present at their latch inputs. At the end of the predecode cycle, the IR2 414 and the mask enable bit latches are clocked and the their outputs become present at the functional units inputs. At this point, the five individual decode and execution stages of the pipeline, 440, 442, 444, 446, and 448, are completed in synchrony providing the iVLIW with parallel execution performance. To allow a non-XV single 32-bit functional instruction to execute by itself in the PE or SP, the bypass VIM path 435 is included. For example, when a simplex ADD instruction is received into IR1 401 for parallel array execution, the predecode function of control unit 412 generates the IR2MUX1 431 control signal, which in conjunction with the ADD instruction pre-decode signal, causes the ALU multiplexer 434 to select the bypass path 435. Since in this case there is no XV in execution, the enable-mask-bits are ignored by the functional unit logic.

Further details of a presently preferred load/disable VLIW instruction (LV) 480, having an encoding format 482 and syntax/operation table 484 are shown in FIG. 4B. Similarly, FIG. 4C shows details of a set VLIW slot state instruction (SETV) 485 having an encoding format 487 and syntax/operation table 489. FIG. 4D shows details of an execute VLIW instruction (XV) 490 having an encoding format 492 and syntax/operation table 494.

The LV instruction 480 of FIG. 4B is used to load individual slots of a specified SP or PE VLIW memory (VIM). The VIM memory address is computed as the sum of a base VIM address register Vb (V0 or V1) plus an unsigned 8-bit offset (VIMOFFS). Any combination of individual instruction slots may be disabled via a disable slot parameter 'D={SLAMD}', where S=Store Unit (SU), L=Load Unit (LU), A=Arithmetic Logic Unit (ALU), M=Multiply Accumulate Unit (MAU), and D=Data Select Unit (DSU). A blank 'D=' parameter does not disable any slots. An instruction loaded into a slot marked by the disable slot parameter remains disabled when loaded. The number of instructions to load in a VLIW are specified via an instruction count (InstrCnt) parameter. Valid values are 1–5. The next InstrCnt instructions following LV are loaded into the specified VIM address (Vb+VIMOFFS). Thus, if InstrCnt=3, then the next three instructions are loaded. An instruction loaded into a slot not marked by the disable slot parameter above is enabled when loaded. A unit affecting flags (UAF) parameter 'F=[AMD]' selects which arithmetic instruction slot (A=ALU, M=MAU, or D=DSU) is allowed to set condition flags for the specified VIM address (Vb+VIMOFFS) when it is executed. 'F=N' selects the ALU instruction slot.

The SETV instruction 485 of FIG. 4C is used to set the enable/disable state of individual instruction slots of a specified SP or PE VLIW memory (VIM). The VIM address is computed as the sum of a base VIM address register Vb (V0 or V1) plus an unsigned 8-bit offset (VIMOFFS). Any combination of individual instruction slots may be enabled via the enable slot parameter "E=(SLAMD)". Any slot not enabled via this parameter is disabled. A blank "E=" disables all slots.

The XV instruction 490 of FIG. 4D is used to execute an indirect VLIW (iVLIW). The iVLIWs that are available for execution by the XV instruction are stored at individual addresses of a specified SP or PE VLIW memory (VIM). Again, the VIM address is computed as the sum of a base VIM address register Vb (V0 or V1) plus an unsigned 8-bit offset (VIMOFFS). Any combination of individual instruction slots may be executed via the execute slot parameter 'E={SLAMD}'. A blank 'E=' parameter does not execute any slots. The Vx bit-24 specifies if this XV1 overrides the LV UAF setting. The unit affecting flags (UAF) parameter 'F=[AMDN]' overrides the UAF specified for the VLIW when it was loaded via the LV instruction. The override selects which arithmetic instruction slot (A=ALU, M=MAU, or D=DSU) or none (N=NONE) is allowed to set condition flags for this execution of the VLIW. The override does not affect the UAF setting specified via the LV instruction. A blank 'F=' selects the UAF specified when the VLIW was loaded. A register file indexing (RFI) parameter "R=0, 1 or N" is used to enable or disable RFI for this execution of the indirect VLIW. "R=0" enables RFI and selects RFI control register group 0. "R=1" enables RFI and selects RFI control register group 1. "R=N" disables RFI. The XV instruction can be conditionally executed. The optional T. or F. prefix indicates the conditional execution of all the individual simplex instructions contained in the VLIW based upon the true or false test of previously generated condition flags in a status control register (SCR0). An SP determines conditional execution from the SCR in its SP register file. A PE determines its conditional execution from the SCR in its PE Register File. When using the [T.] or [F.] conditional execution forms of XV, the UAF parameter must be 'F=N' because the CE2 form of conditional execution does not allow the condition flags to be updated. In unconditional XV execution, the condition flags are set by the individual simplex instruction in the slot specified by the setting of the 'F=' parameter from the original LV instruction or as overridden by an 'F=[AMD]' parameter for an XV2 instruction. Condition flags are not affected when 'F=N'. The XV2 operation takes one execute cycle to complete. Pipeline considerations must be taken into account based upon the individual simplex instructions in each of the slots that are executed.

Alternative Synchronous MIMD Operation

Synchronous MIMD operation of a ManArray processor may be described as operation in which a single instruction causes different VLIWs in various PEs to be executed in parallel. For further details on one approach to synchronous MIMD operation, see "Methods and Apparatus for Efficient Synchronous MIMD Operations with iVLIW PE-to-PE Communications" U.S. application Ser. No. 09/187,539 filed Nov. 6, 1998, now U.S. Pat. No. 6,151,668, issued Nov. 21, 2000. In the approach described in the present invention, new methods of achieving synchronous MIMD execution are obtained through use of the VIM base address register. FIGS. 4E–4H illustrate a program 495 that uses the Vb register to accomplish this alternative synchronous MIMD operation using the base plus offset addressing mode of the present invention. In this exemplary approach, the program 495 determines the maximum or minimum of five numbers locally in each PE. The determination of whether a PE is to calculate a maximum or minimum is dependent upon a data value which is loaded by the program but which could, in an alternative approach, be dynamically computed. Consequently, the value can be different on each PE. In the example shown, the minimum of the local five numbers will be calculated on PE0 and PE2 while the maximum of the local five numbers will be calculated on PE1 and PE3, in a 2×2 ManArray processor, such as the processor 100 shown in FIG. 1. FIG. 4E contains a local memory data specification 496a for PE0 for a first integer statement containing two numbers (1, 3) and for a second integer statement containing five numbers (10, 2, 5, 8, 6) in PE0. Similarly, local memory data specification 496b specifies integer values 3, 0 and five numbers (5, 2, 3, 9, 7) in PE1. FIG. 4F contains the local memory data specifications 496c and 496d for PE2 and PE3 containing integer values 5, 9 and five numbers (9, 5, 1, 2, 4) in PE2 and integer values 1, 0 and five numbers (2, 6, 8, 3, 5) in PE3. Code 497 of FIG. 4F also begins the program's control of the loading of the VIMs in each PE with the same two VLIWs, one for computing the minimum and one for computing the maximum. FIG. 4G continues the program 495 with code 498 for the initialization of two registers that are to be used to point to the iVLIW for either the minimum or the maximum. Also included is code 499 to determine in each PE whether to compute the maximum or the minimum using the two integer values previously set up in each PE. This determination is accomplished through a comparison of the first integer with the second integer. If the first is larger than the second for a PE, that PE will compute the maximum. If the comparison shows the first integer is less than or equal to the second integer for a PE, the minimum will be calculated in that PE.

Using a copy selective instruction 470, the Vb base register is set up to point to the appropriate VLIW to calculate the maximum or minimum. An encoding format 472 and a syntax/operation table 474 for a presently preferred copy selective (COPYS) instruction is shown in FIG. 4I. This instruction 470 is used to select data elements from either Rx/Rxe or Ry/Rye and to copy them to the corresponding elements of Rt/Rte. Selection is based on the states of arithmetic condition flags (ACFs). If the ACF associated with a particular data element position is a 1, then the element from Rx/Rxe is copied to Rt/Rte. Otherwise, the element from Ry/Rye is copied to Rt/Rte.

The program 495 then continues with the code 499a for the execution of the iVLIWs shown as the sequence of six XVs. Each XV is dispatched to all of the PEs; however, in PE0 and 2, a different VLIW is selected than the VLIW selected in PE1 and 3. Each XV executes in parallel thereby accomplishing synchronous MIMD operation. At the completion of code 499b of program 495, register R7 in each PE holds its local maximum or minimum value. Specifically, PE0 and PE2 hold the minimum of their local data values, and PE1 and PE3 hold the maximum of their local data values.

Indirect/Indexed Addressing

Figure 5:
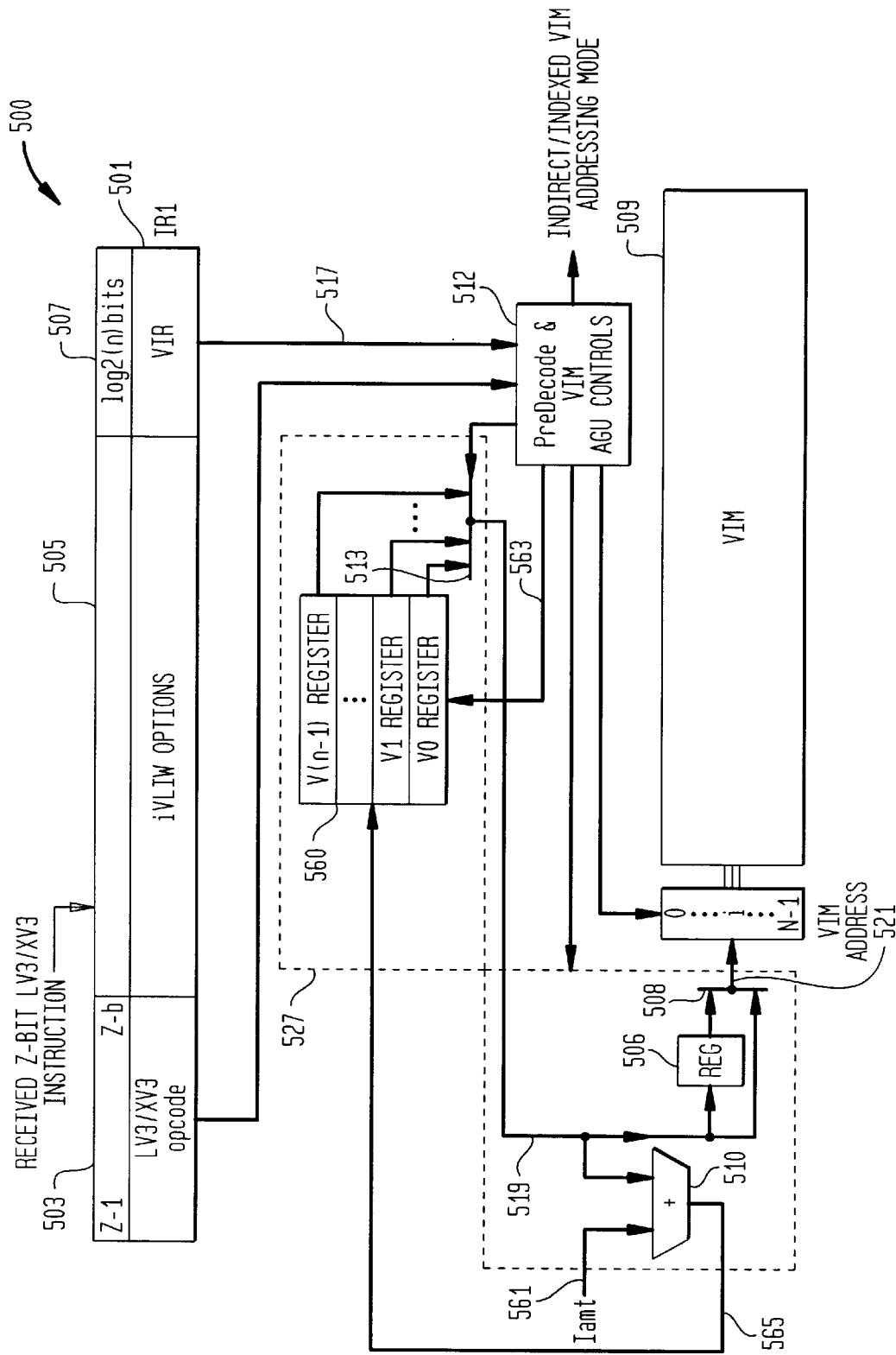
FIG. 5 illustrates a VIM indirect addressing mode apparatus and instruction format in accordance with the present invention.

FIG. 5 illustrates an indirect/indexed addressing mode apparatus 500 that allows a VLIW to be specified by the contents of an address register. The address register may be optionally updated after a VLIW access by a specified amount allowing the next VLIW access to specify a different VLIW. This mode provides a high degree of flexibility since only a small instruction field is required to specify a VIM address register. Thus, this approach allows an instruction set with a small word size (e.g. 16-bit) to access a VIM with a very large VLIW size, thus providing very high performance capability to processors with an otherwise simple instruction set, such as microcontrollers.

An indirect/indexed addressing VLIW SIW is shown as it is received in instruction register 1 (IR1) 501 of FIG. 5. The iVLIW instruction is logically formatted into three major sections or fields, one section 503 for the opcode which may include a VIM addressing modes option field, one section 505 for various iVLIW options defining the function of the issued SIW, and one section 507 for the VIM register selection field (VIR). There are $\log_2(n)$ bits for the VIR field 507 which can vary depending upon the number of address registers and the number of bits Z in the instruction. For example, Z can typically be 16, 24, 32, 48, or 64-bits though other numbers of bits are not precluded, and the number of address registers can vary from 1 to "n". The output of IR1 is pre-decoded by a VIM AGU control unit 512 early in the pipeline cycle to control the VIM accessing and VLIW execution. Register block 560 shows "n" VIM address registers in a VIM address register section 527. The load path to store address values into the registers 560 is not shown, but these registers are part of the processor's context and can be loaded, saved, and restored in a well known manner. One of the "n" VIM address registers is selected by the VIM AGU control unit 512 which controls switching of multiplexer 513. The selected address register value is provided on 519 as an input to a further multiplexer 508. The path 519 is selected at multiplexer 508 for execute VLIW instructions to a VIM address 521 of VIM 509. The address register value 519 is also input to adder 510 which is available to add a specified increment value (Iamt) 561 and loads the original value or the addition sum 565 into the instruction selected Vx address register in register block 560. The reading and loading of data from the address registers 560 is controlled by the VIM AGU control unit 512 with write enables and read controls on path 563. A typical Iamt would be a zero when no increment is to occur and otherwise a one, or other value since Iamt is not limited architecturally. The indirect/indexed addressing mode can also be used for synchronous MIMD operations.

Base Plus Index Addressing

Figure 6:
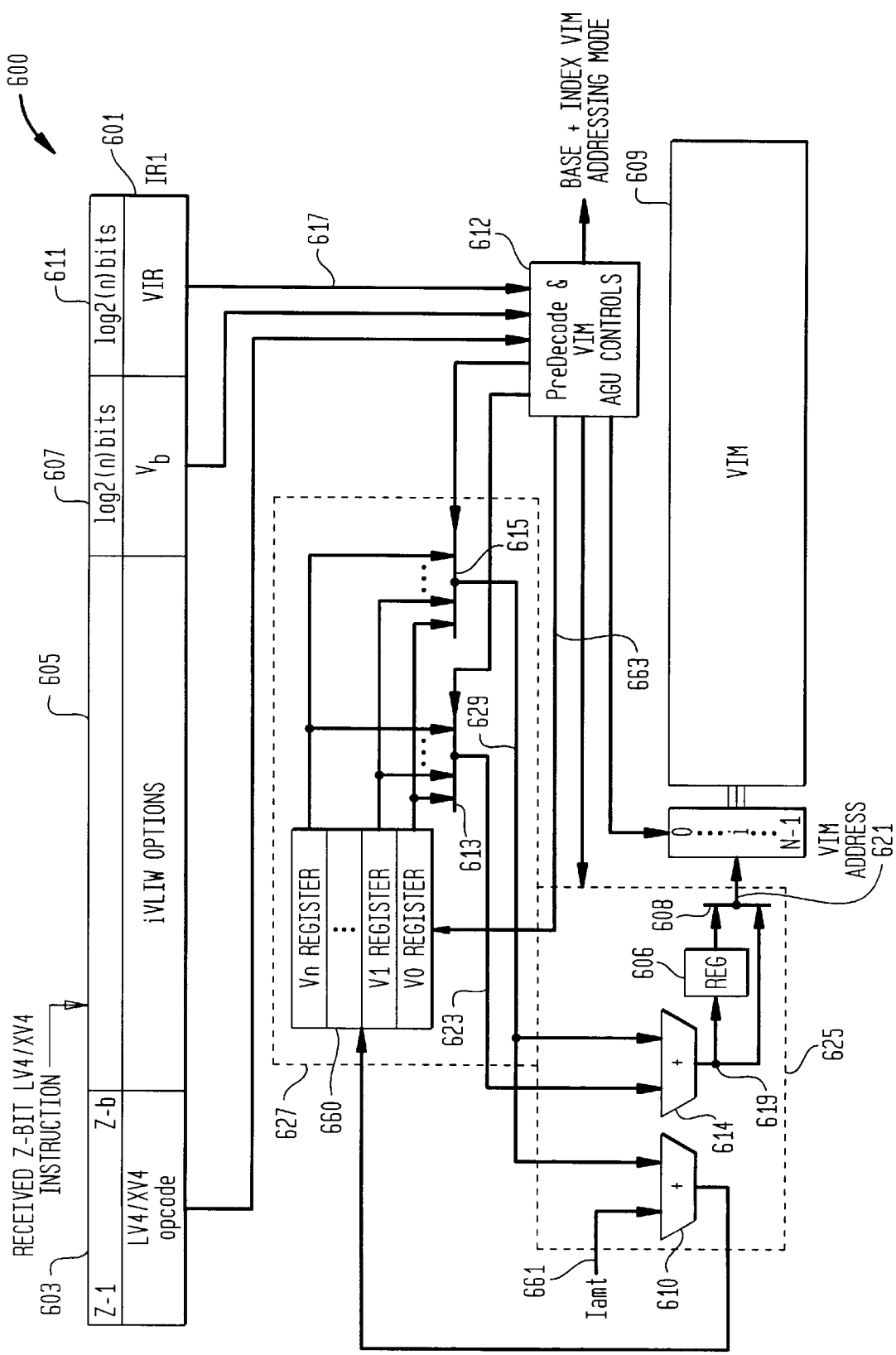
FIG. 6 illustrates a VIM indexed address mode apparatus and instruction format in accordance with the present invention.

FIG. 6 illustrates a base plus index addressing mode apparatus 600 that allows a programmer to specify a VLIW using the sum of two address registers, one acting as a base while the other acts as an index. The index register may be optionally updated after the access by a specified amount allowing the next access to specify a different VLIW relative to the base address.

A base plus index addressing VLIW SIW is shown as it is received into an instruction register 1 (IR1) 601. The iVLIW instruction is logically formatted into four major sections or field, one section 603 for the opcode which may include a VIM addressing modes option field, one section 605 for various iVLIW options defining the function of the issued SIW, one section 607 for the VIM base address register selection, and one section 611 for the VIM index address. There are "n" VIM address registers 660 shown in FIG. 6 to select the base and index registers from. Consequently, both the VIM base registers selection field Vb 607 and the VIM index register selection field VIR 611 are $\log_2(n)$ bits, which can vary dependent upon the number of address registers and the number of bits Z in the instruction. For example, Z can typically be 16, 24, 32, 48, or 64-bits though other numbers of bits are not precluded. The output of IR1 is pre-decoded in control unit 612 early in the pipeline cycle to control the VIM accessing and VLIW execution. The load path to store address values into the registers 660 is not shown, but these registers are part of the processor's context and can be loaded, saved, and restored in a known fashion. One of the "n" VIM address registers is selected by multiplexer 613 as a base address value and the selected base address register value is provided on path 623 as an input to adder 614. The index address register is selected by multiplexer 615 and the selected index address register value is provided on path 629 as an input to the adder 614. The sum 619 of the base plus the index value is selected by multiplexer 608 for execute VLIW instructions at a VIM address 621 for VIM 609. The index address register value 629 is also input to adder 610 which adds a specified increment value (Iamt) 661 and loads the addition sum 665 into the instruction selected Vx index address register in register block 660. The reading and loading of data from the address registers 660 is controlled by control unit 612 with write enables and read controls on path 663. A typical Iamt would be zero when no increment is to occur and otherwise a one, or other value since Iamt is not limited architecturally. The above described base plus index addressing mode can also be used for synchronous MIMD operations.

Circular Indexed Addressing

Figure 7:
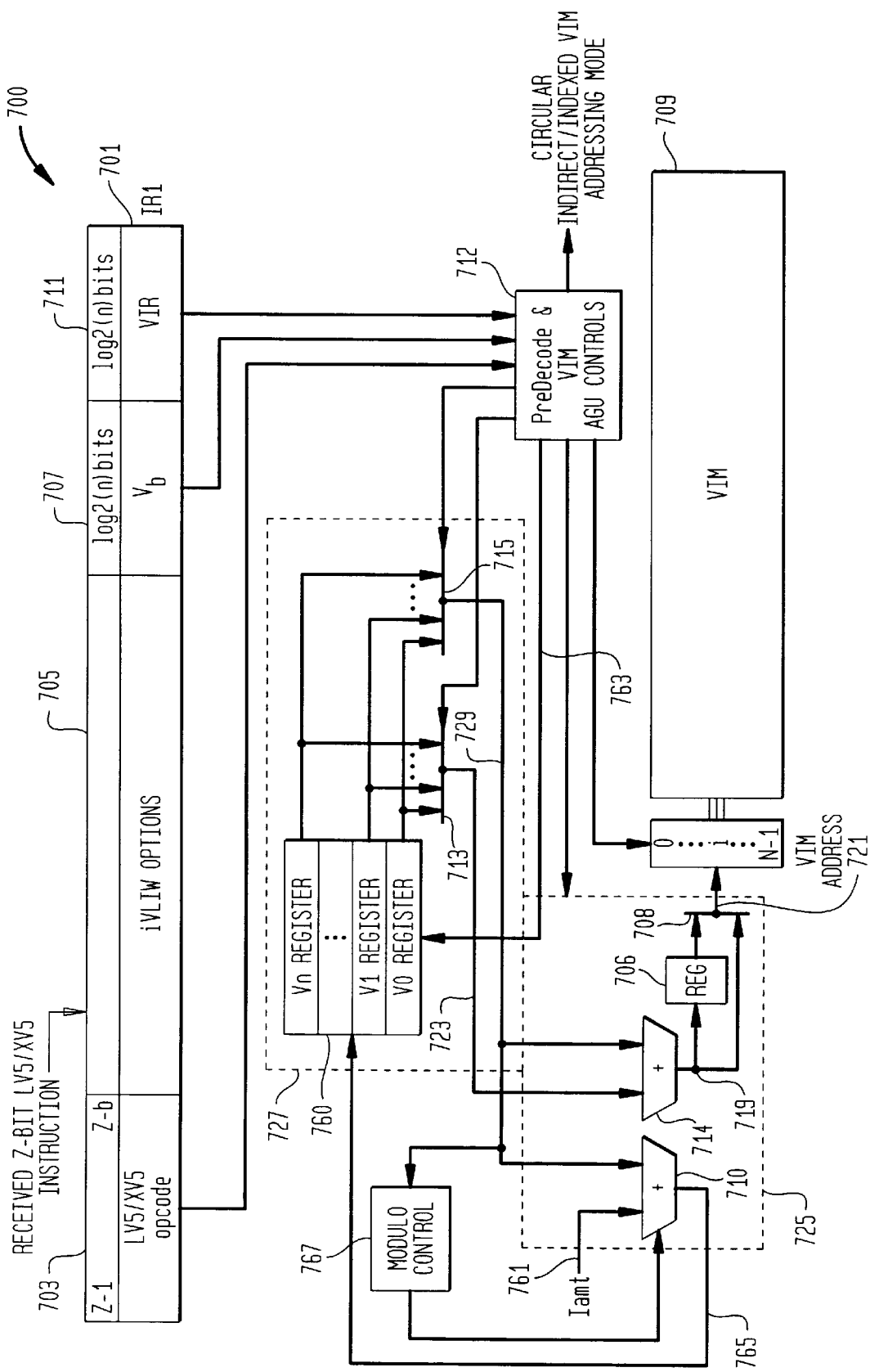
FIG. 7 illustrates a VIM circular indirect/indexed addressing mode apparatus and instruction format in accordance with the present invention.

FIG. 7 illustrates a circular indexed addressing mode apparatus 700 that allows the programmer to specify a VLIW by the contents of an address register just as was the case for the base plus index addressing mode illustrated in FIG. 6. In circular indexed addressing, the address register, one of a block of registers 760, is always updated by adding an output from an adder 710. Adder 710 receives as one input an update value (Iamt) 761 after the access. Additionally, the address is always adjusted to force it to lie within a block of addresses appropriate for the size of the VIM as controlled through adder 710 and a modulo control block 767. The address register used as the base, as selected by multiplexer 713, provides the start address of the circular range and the register specified by an "Index/Mod" field 711, selected via multiplexer 715 as address value 729, is treated as specifying both the index (which is updated) and the size of the block of addresses Mod field (not updated). This latter register selected on path 729 is preferably split into equal halves, one for the index and the other for the circular buffer size. The circular mode also allows a block of VLIWs to be accessed sequentially or by a specified amount (Iamt), during normal program flow or in a program loop. The circular indexed addressing mode can also be used for synchronous MIMD operations.

PE Relative Addressing

Figure 8:
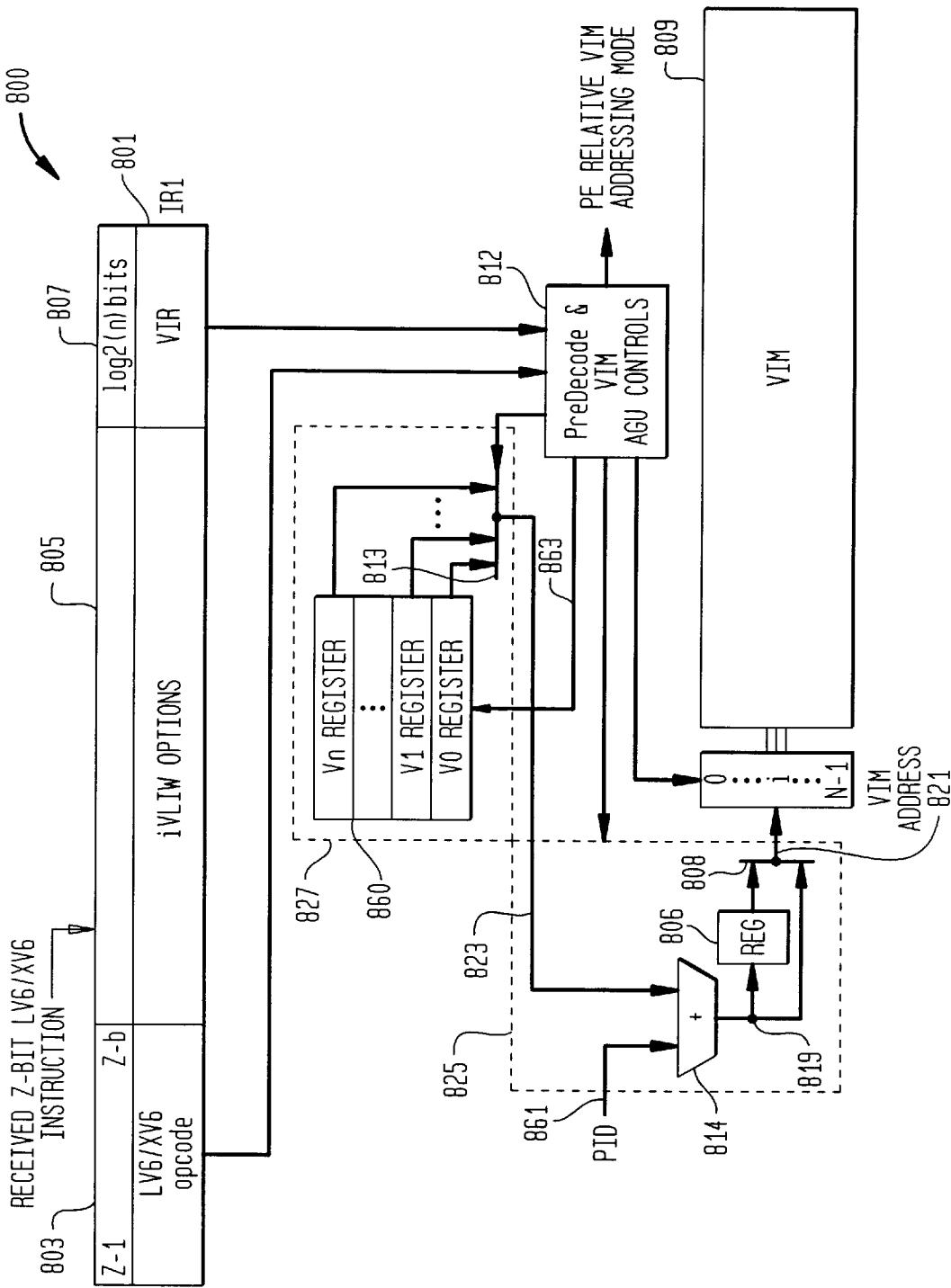
FIG. 8 illustrates a VIM PE relative addressing mode apparatus and instruction format in accordance with the present invention.

FIG. 8 illustrates PE Relative addressing mode apparatus 800 that provides an implicit method for selecting VLIWs based on each PE's identification (ID). This selection may be made using a common base register selection through a multiplexer 813 or as an offset relative to a direct address (not shown, but similar to direct address section or field 207 of FIG. 2). In the embodiment of FIG. 8, a PE's ID 861 is added by an adder 814 to a specified base address 823, a register selected from register block 860 by multiplexer 813, to obtain a result on path 819 that is selected in multiplexer 808 to become the VIM address 821 for each PE's VIM, distinguished by each PE's ID. A variation of this approach is to allow the PE's ID to be substituted for selected bits of a specified base address (register or direct) to obtain the VIM address. These bits could be low order bits or some other group of bits depending on the degree of separation desired between VIM addresses. This latter variation would be a lower cost method not requiring the adder 814. The PE relative addressing mode has an inherently synchronous MIMD operation as the VIM address selection is based upon the PE ID.

Selective Execution

PE relative addressing is actually a form of "selective execution" based upon PE ID as opposed to conditional execution. Another form of selective execution performed by each PE is based on arithmetic or logical conditions where one or the other of two VLIWs is selected based on the condition state information locally available in the SP and in each PE. The VLIW address could be obtained in any of several ways. Among these ways are the following. An implied offset can be specified as a 0 (specified condition is TRUE) or as a 1 (specified condition is FALSE) relative to a base value obtained from the XV instruction or a VIM address register. For example, in FIG. 3, the offset value on path 315 would be determined to be 0 (specified condition is True) or a 1 (specified condition is False). A specified condition state could also be the value of an arithmetic condition flag (ACF) F0.

Alternatively, an implied VIM address register selection may be based on a specified condition. If $V_e$ and $V_o$ represent even and odd numbered VIM address registers, then a "selective execution" option in an instruction might choose $V_e$ (specified condition is TRUE) or $V_o$ (specified condition is FALSE) to participate in the VIM address calculation, using the address mode already defined in the instruction. For example, in FIG. 3, the selection of the two Vb registers can be based on local conditions. Register $V_0$ is selected when the specified condition is true and $V_1$ is selected when the specified condition is false. The conditionally selected address register may be a base address register as in FIGS. 3 and 4, an address register as in FIG. 5, either or both the base and index address registers of FIGS. 6 and 7, or the address register used in PE relative addressing in FIG. 8, or some combination of these registers. Such an approach is highly flexible.

LV Instruction

The LV instruction causes the following N instructions to be sequentially loaded into a particular VIM address. The VIM address can be specified with any of the above addressing modes. Even the circular addressing mode may be used, allowing a block of VLIWs to be loaded, used, then reloaded without the executing program needing to know the base address of the block of VLIWs. The index or indirect address register is updated after each LV instruction but not after each instruction which is part of the VLIW being loaded.

Compact Instructions

Compact instructions, as defined for the ManArray architecture, are 15-bit instructions and include iVLIW XV type instructions. The multiple addressing modes described herein are applicable to the compact type of instruction. For example, the following bit-field definitions can be used for compact XV instructions. Beginning with a base plus offset addressing mode, a compact instruction can be defined which uses 1-bit for the Vb selection field and 4-bits for the offset field. For the indirect/indexed addressing mode, 3-bits could be defined to select one of eight VIM address registers. In the base plus index addressing mode, a 2-bit field could be provided for the base address register selection and a 2-bit field for the index register selection. The circular indexed addressing mode is also applicable for compact instructions, as is PE relative addressing. The compact instructions, for one addressing mode, are defined in greater detail in U.S. application Ser. No. 09/215,081 entitled "Methods and Apparatus for Scalable Instruction Set Architecture with Dynamic Compact Instructions" and filed Dec. 18, 1998, now U.S. Pat. No. 6,101,592, issued Aug. 8, 2000.

Applying a variety of address modes to VLIW memory as described herein provides many advantages both for high performance processor design and for programmer and compiler flexibility. Among these advantages are SIW memory allows for small instruction bus width. Having a VIM separate from the SIW memory allows for balance between parallel instructions and sequential instructions. Addressing modes supply VLIW code relocatability which provides for more efficient use of VIM, flexibility for code generators, ease of supporting optimized library code. Addressing modes also allow for subroutines to be called which execute a sequence of VLIWs independent of their contents. A single routine can be written to execute any number of VLIWs in sequence without respect to their location. Additionally, a VIM-per-PE approach along with register-based addressing allows an alternative means for synchronous MIMD operation. Circular addressing of VIM provides the ability to rapidly load and use VLIWs while staying within a fixed VIM range. It also allows the use of looping instructions to take advantage of sequential VLIW access, minimizing SIW instruction usage. The use of register based address modes allows for greater flexibility in opcode space making more bits available. This approach may be applied to other functions or allow VLIW specification in shorter instruction words. Further, PE relative addressing provides an implicit method for selecting VLIWs conditioned on PE ID. These advantages will be recognized as exemplary only and are not meant to define the coverage of the present invention which is governed by the claims.

While the present invention has been disclosed in a presently preferred context, it will be recognized that the present teachings may be adapted to a variety of contexts consistent with this disclosure and the claims that follow.

We claim:

1. An apparatus including a plurality of addressing modes for providing indirect access to very long instruction words (VLIWs) allowing both sequential code and parallel operations in the form of VLIWs to be encoded efficiently, wherein the sequential code comprising a sequence of short instruction words (SIWs) including indirect VLIW SIWs is loaded as part of a single instruction stream, the apparatus comprising:

a short instruction memory fetch logic for fetching a short instruction word from a short instruction memory (SIM);

the short instruction memory storing the short instruction word, said short instruction word including a field defining an addressing mode associated with the short instruction word, wherein said addressing mode is one of the plurality of addressing modes for accessing the VLIW instruction;

an instruction decoder for decoding the short instruction word;

a VLIW instruction memory (VIM) for storing VLIW instructions;

a VLIW memory address unit (VIM AGU) for determining the addressing mode associated with the short instruction word;

VIM address registers; and a VIM address generation mechanism for selecting a VLIW in said VIM by generating a VIM address according to the address mode associated with said short instruction word;

wherein said addressing mode associated with the short instruction word is one of said plurality of addressing modes: a direct VIM addressing mode, a base plus offset addressing mode, an indirect/indexed addressing mode, a circular indexed addressing mode, or a processing element (PE) relative addressing mode.

2. The apparatus of claim 1 further comprising a VIM direct address mode apparatus having:

a first instruction register (IR1) for storing the short instruction word including direct address bits;

said VIM AGU operating to determine that the short instruction word in the first instruction register is a direct VIM addressing mode instruction and providing direct addressing mode control signals; and said VIM address generation mechanism operating to receive the direct addressing mode control signals and the direct address bits from the first instruction register to produce a VIM address value.

3. The apparatus of claim 2 wherein the first instruction register is formatted into at least three major sections a first section for opcode which may include a VIM addressing mode option field, a second section for iVLIW options defining a function of an issued SIW, and a third section for a VIM direct address.

4. The apparatus of claim 1 further comprising a VIM base displacement addressing apparatus having:

a first instruction register (IR1) for storing the short instruction word defining a base-plus-displacement VIM addressing mode;

a plurality of base registers storing different base values;

said VIM AGU operating to select one of the plurality of base registers;

an adder for receiving a base value from the selected base register and to add an offset from said short instruction word to produce a result;

an adder result register for storing the adder result if the short instruction word is a first type of instruction; and a selector for directly selecting the adder result for a VIM address if the short instruction word is a second type of instruction, and for selecting the stored adder result from the adder result register if the short instruction word is the first type of instruction.

5. The apparatus of claim 4 wherein the first type of instruction is a load VLIW instruction.

6. The apparatus of claim 4 wherein the second type of instruction is an execute VLIW instruction.

7. The apparatus of claim 4 wherein the selector is a multiplexer which is selectively controlled by a control signal from said VIM AGU.

8. The apparatus of claim 4 wherein the first instruction register stores a 32-bit execute VLIW (XV) base-plus-offset instruction including a plurality of enable mask bits and a plurality of offset bits.

9. The apparatus of claim 1 further comprising a VIM indirect/indexed address mode apparatus having:
- a first instruction register (IR1) for storing an iVLIW instruction having at least one address register selection bit;
- a plurality of address registers storing different address values, a particular one of the address registers selected based upon a calculation utilizing the at least one address register selection bit; and
- said VIM address generation mechanism operating to generate the VIM address based upon the address value for the particular address register selected.

10. The apparatus of claim 9 further comprising an adder which adds a specified increment value to the value from the particular address register creating a result to be stored into the particular address register for future use.

11. An apparatus including a plurality of addressing mode instructions for providing indirect access to very long instruction words (VLIWs) allowing both sequential code and parallel operations in the form of VLIWs to be encoded efficiently, wherein the sequential code comprising a sequence of short instruction words (SIWs) containing compact instructions including indirect VLIW SIWs is loaded as part of a single instruction stream, the apparatus comprising:
- a short instruction memory fetch logic for fetching a compact instruction from a short instruction memory (SIM);
- an instruction decoder for decoding the compact instruction;
- a VLIW instruction memory (VIM) for storing VLIW instructions;
- a VLIW memory address unit (VIM AGU) for determining the addressing mode associated with the compact instruction;
- VIM address registers;
- a VIM address generation mechanism for selecting a VLIW in said VIM by generating a VIM address; and
- a first instruction register (IR1) for storing said compact instruction including an identifying address bit or bits, wherein said VIM AGU operates to determine that the compact instruction in the first instruction register is one of said plurality of addressing mode instructions: a direct VIM addressing mode instruction, a base plus offset addressing mod instruction, an indirect/indexed addressing mod instruction, a circular indexed addressing mode instruction, or a processing element (PE) relative addressing mode instruction, and to provide appropriate VIM addressing mode control signal.

* * * * *